United States Patent [19]

Loucks et al.

[11] Patent Number: 5,241,656
[45] Date of Patent: Aug. 31, 1993

[54] DEPTH BUFFER CLIPPING FOR WINDOW MANAGEMENT

[75] Inventors: Larry K. Loucks; Richard O. Simpson, both of Austin, Tex.

[73] Assignee: International Business Machines Corporation, Armonk, N.Y.

[21] Appl. No.: 807,798

[22] Filed: Dec. 13, 1991

Related U.S. Application Data

[63] Continuation of Ser. No. 306,125, Feb. 6, 1989, abandoned.

[51] Int. Cl.[5] .......................... G06F 15/62; G06F 3/14
[52] U.S. Cl. ................................ 395/158; 395/157; 395/155; 340/750
[58] Field of Search ...................... 395/157, 158, 155; 340/747, 750

[56] References Cited

U.S. PATENT DOCUMENTS

| | | | |
|---|---|---|---|
| 4,642,790 | 2/1987 | Minshall et al. | 395/158 |
| 4,688,167 | 8/1987 | Agawal | 395/158 |
| 4,700,320 | 10/1987 | Kapur | 395/158 |
| 4,737,922 | 4/1988 | Ogasawara et al. | 364/519 |
| 4,791,581 | 12/1988 | Ohba | 364/521 |
| 4,796,201 | 1/1989 | Wake | 364/518 |
| 4,922,432 | 5/1990 | Kobayashi et al. | 395/141 |
| 4,933,877 | 6/1990 | Hasebe | 364/521 |
| 5,101,365 | 3/1992 | Westbug et al. | 395/158 |

FOREIGN PATENT DOCUMENTS

| | | |
|---|---|---|
| 0065423 | 11/1982 | European Pat. Off. . |
| 0261463 | 3/1988 | European Pat. Off. . |
| 2180729 | 4/1987 | United Kingdom . |
| 8502049 | 5/1985 | World Int. Prop. O. . |
| 8700329 | 1/1987 | World Int. Prop. O. . |

*Primary Examiner*—Phu K. Nguyen
*Attorney, Agent, or Firm*—J. B. Kraft

[57] ABSTRACT

In a computer system with a screen display on which is formed a plurality of at least partially overlapping windows associated with different applications, a depth buffer is added to the display adapter for providing with different applications, a depth buffer is added to the display adapter for providing clipping assistance to the software-based window manager. A refresh buffer stores pixel data for each pixel of the display. The window manager monitors the current depth position of each of the pixels within the display and generates a depth value for each pixel. In response to an input request for window rearrangement, the window manager assigns a new depth value to each pixel in a window affected by the request, requests that each application affected by the rearrangement to retransmit pixel values for the pixels associated with at least the portion of a affected window which will become visible as a result of the rearrangement, and transmits new depth values for at least the pixels within the affected portions of such windows. The depth buffer receives and compares the new depth values with the current depth value for each pixel. If the comparator determines that the new pixel value has a depth value associated with the same window or a window closer to the viewer, the depth buffer notifies the refresh buffer to store the new pixel values for each of the applications affected by the rearrangement.

10 Claims, 10 Drawing Sheets

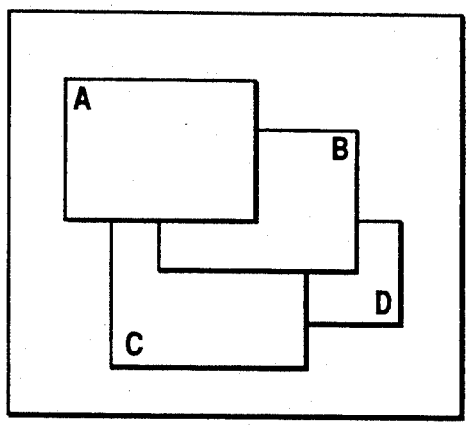
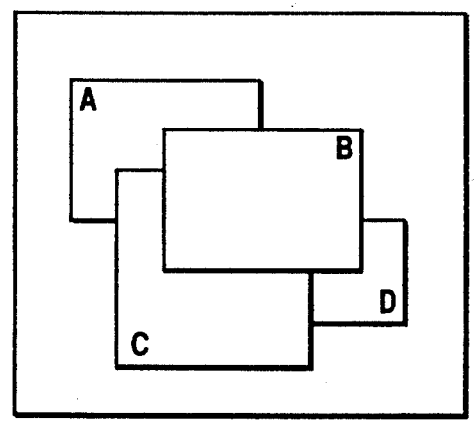
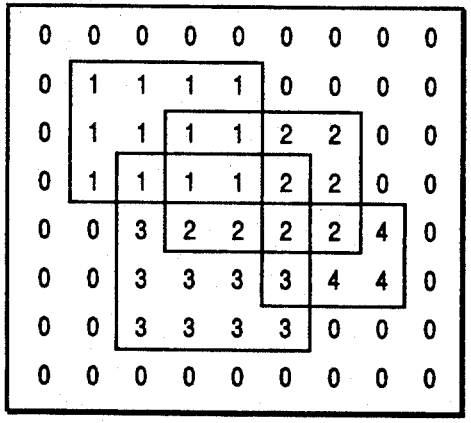
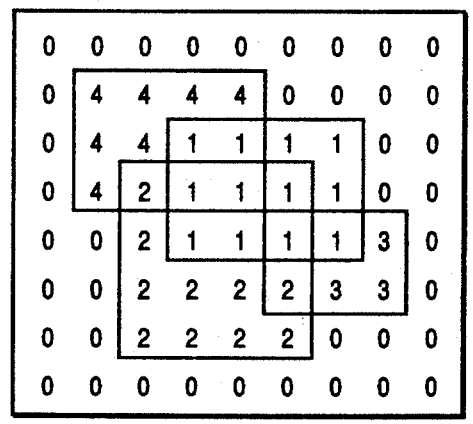
FIG. 7A   FIG. 7B

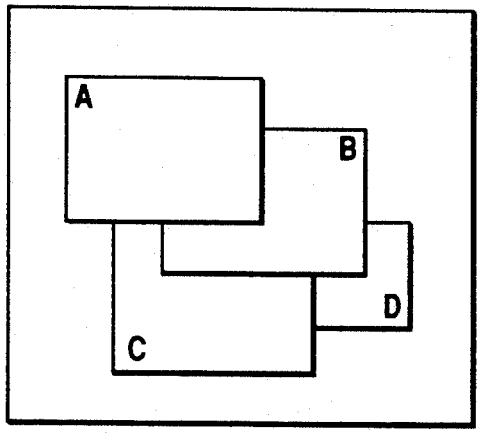
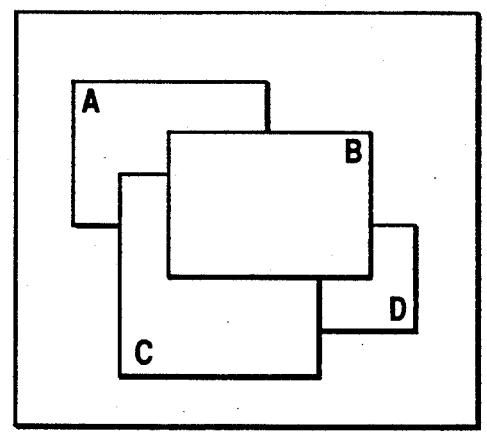
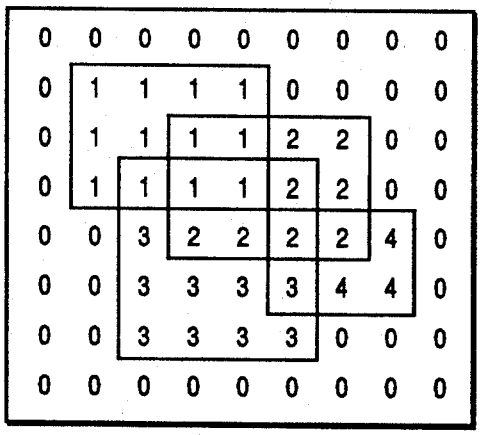
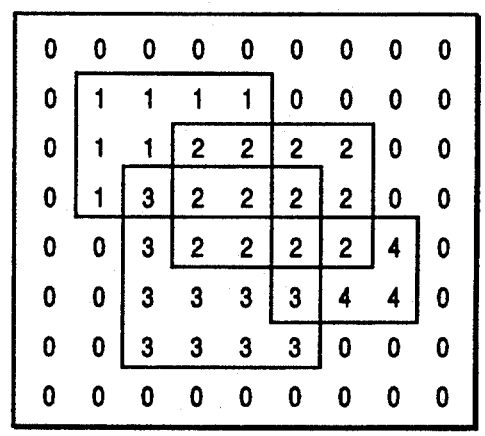
FIG. 11A  FIG. 11B

DEPTH BUFFER CLIPPING FOR WINDOW MANAGEMENT

This is a continuation of application Ser. No. 07/306,125 filed Feb. 6, 1989, now abandoned.

TECHNICAL FIELD

The present invention relates to computer display windowing, and more specifically to providing hardware-based clipping systems to assist a softwarebased window manager.

BACKGROUND ART

Recent developments in the technology associated with data processor-controlled interactive display terminals have provided the operator with the capability of displaying the contents of several documents or records on a display terminal screen at the same time. The contents are typically displayed in a plurality of often overlapping windows, wherein each window displays the contents of a particular document or computer file. U.S. Pat. Nos. 4,586,035 and 4,714,918 are illustrative of the manner in which such overlapping windows are used in computer systems.

In a typical windowing system such as X-Windows[1], as described in *X-Windows User Guide and Reference* for the IBM RT-PC, 1987, a single physical screen is used to display several windows in a "space-multiplexed" fashion. In the newer of such computer systems, several applications can be simultaneously run on the computer. Each application being run on the computer typically "owns" one or more windows on the display screen. Normally, the applications are independent of one another, and, accordingly, the contents of one screen are independent of the contents of the other screens. The windows may be of different sizes and may partially or completely overlap.

[1]X-Windows is a trademark of IBM Corporation.

The windows are typically under the control of a software-based display manager system which views the windows as a stack so that there is a total ordering of the windows with respect to depth. For example, at any given time, one window is on top, one is on the bottom and the other windows are ordered somewhere in between. Since a window normally does not occupy the entire display area of a display screen and/or may be partly or totally obscured by other windows, applications running on multi-tasking computer systems having windowing capabilities normally are not allowed to write directly to the display adapter in order to generate displays associated with such applications.

Typically, the applications in such a computer system must request a window manager to transmit data to the display screen on its behalf. The software-based window manager insures that the output for an application is written only to the window(s) owned by that application by "clipping" the output request and discarding those portions of the graphic or text output from that application which would lie outside the window or portion thereof formed on the screen for an application. This clipping is normally done by a software-based utility program, and it can be very time-consuming.

Recently, there have been significant advancements in the field of interactive computer graphics to speed up the processing of data necessary to generate the complex computer-generated pictures representative of the present state-of-the-art. Such techniques are described, for example, by J.D. Foley and A. Van Dan in *Fundamentals of Interactive Computer Graphics*, Addison-Wesley, 1982. One of the techniques commonly used in the field of three-dimensional interactive computer graphics is a "Z-buffer". Particularly, a Z-buffer is a simple hardware device used to eliminate hidden lines and hidden surfaces when showing a computer-generated picture on a raster-scan display.

In the past, interactive computer graphic systems would normally used special-purpose computers to generate models of three dimensional objects typically consisting of many polygons. Each polygon had its own location and orientation in three dimensional space, as well as its own color and intensity information.

The display of a three-dimensional object by a computer system typically requires computing a color/intensity value for each pixel. For a given orientation of the object being viewed on a screen, a pixel on the display screen may potentially come from more than one polygon in the object. The pixel value that is displayed on such systems is from the polygon which is "in front of" any other polygons in the line of sight from the viewer through the pixel in question.

When a picture of a three dimensional object is displayed in such computer graphic systems, the polygons making up the object are processed in some order. This order may be the natural order in which the polygons are encountered; which depends on the way the data structure defining the object is constructed, or it may be sorted in some way to make the output process simpler. For example, the polygons may be sorted by depth (z-value) so that those polygons which are further from the observer are encountered first. This sorting is typically done in computer graphic systems so that any particular scene may be displayed on a screen by processing the polygons in a sorted order and, for each polygon, inserting the proper values in the pixels covered by that polygon. A pixel may be written to several times, depending on how many polygons in any given three dimensional object overlap the point on the screen defined by the pixel. Since the polygons are sorted by depth, the last value written to any pixel will be the value for that pixel's closest polygon. In other words, those polygons which are nearest the observer will obscure polygons further back.

It has been found that sorting polygons by depth is usually not desirable because of the lengthy processing time involved and because the sorting was not foolproof. For example, polygons which intersect one another or which overlap one another in complicated ways in three dimensional space cannot necessarily be sorted based upon one z-value; rather, sorting actually needs to be done for each pixel if the sorting is to be completely accurate. If the object is rotated, is moved with respect to the background, or is moved with respect to other objects in the screen, or if the viewpoint of the observer changes, then the sort must be done again.

It has been found that in such three-dimensional computer graphics applications, the use of a Z-buffer avoids the need for any type of sort by saving the depth information (z-value) for each pixel along with the color/intensity value. See Foley and Van Dan at pp. 560-561. The use of a Z-buffer, thus, allows polygons making up a scene to be processed in any order because depth information is tracked per pixel rather than per polygon. Accordingly, strange overlappings of polygons and intersecting polygons will not have an adverse effect on generating the computer image.

The disadvantages associated with the time-consuming software clipping used in updating windows in computer systems having a shared display surface is overcome by the present invention by the addition of a hardware-based depth buffer for windows in the conventional display adapter. The present invention also reduces the time needed to update or rearrange the windows by allowing a particular application to be given direct access to the display adapter of the computer system, while insuring the integrity of the subject matter on windows belonging to other applications being run on the computer system.

DISCLOSURE OF THE INVENTION

The present invention provides for a new and improved method of and system for updating and rearranging windows in a computer system having a refresh buffer and an interactive display terminal with a screen display on which is formed a plurality of at least partially overlapping windows, wherein each window currently displays subject matter different from that displayed on the remainder of the screen. The improvement includes an input device for requesting a rearrangement of the depth positions of the plurality of overlapping windows relative to a reference position from a current arrangement to a new arrangement, a window manager for sensing the current depth position of each of the plurality of overlapping windows and assigning a depth value to the subject matter currently associated with each of the plurality of overlapping windows. In response to an input request, the window manager also determines a new depth position for the new window arrangement, assigns a new depth value to the position of the subject matter associated with each window which is affected by the input request, and notifies any affected application to retransmit those portions of the subject matter being displayed on the screen which will be affected by the input request. Preferably, the subject matter associated with each of the windows is defined as an array of pixel values having specific pixel addresses.

The computer system includes a depth buffer for receiving and storing the depth values of the subject matter associated with each of the overlapping screens currently being displayed on the screen. In response to the retransmission of subject matter from the affected applications and the depth values associated therewith in response to the input request, a comparator in the depth buffer compares the depth values for the newly transmitted subject matter to the depth values for the subject matter being currently displayed on the screen. If the new subject matter has a depth value associated with the same window or a window closer to the viewer, the buffer notifies the refresh buffer to store the new subject matter for the purpose of refreshing the screen and notifies the depth buffer to store the new depth values.

The present invention may be implemented in several alternative hardware configurations. In one configuration, a depth value associated with the subject matter in a window is a concatenation of the window depth position and the depth value of the subject matter within the window. The depth buffer then compares the new concatenated value with the current concatenated value to determine whether the refresh buffer and depth buffer should store the new subject matter and depth values, respectively.

In another embodiment, the depth buffer includes a window depth table which stores the current depth position associated with each window identification. In this embodiment, the window manager, in response to an input request, outputs new pixel depth values for each window identification listed in the window depth table. The comparator then reads from the window depth table the depth value of the window identification for each pixel density currently in the depth buffer and the depth value for the new window identification and compares the respective depth values obtained from the window depth table.

In another embodiment of the present invention, the depth buffer includes a first and second comparator wherein the first comparator compares the new window identification with the current window identification and the second comparator compares the pixel depth value associated with each current window identification with the new pixel depth value associated with the new window identification. If the first comparator determines that the current window and new window identifications are equal and the second comparator determines that the new pixel value is less than or equal to the current pixel value, a logic unit coupled to the outputs of the first and second comparators notifies the refresh buffer to store the new pixel values and notifies the depth buffer to store the new window identification.

In another embodiment, the depth buffer includes both a first buffer array and a second buffer array, wherein the first buffer array stores the current window identification for the subject matter being displayed on each of the overlapping windows and the second buffer array stores the current pixel depth value of the subject matter being displayed on each of the overlapping windows. The depth buffer also includes a first comparator coupled to the first buffer array for comparing the new window identification with the current window identification wherein, if the current and new window identifications are the same, the first comparator outputs an enable signal. The second comparator is coupled to the second buffer array for comparing the current pixel depth value with the new pixel depth value upon receiving the enable signal from the first comparator. If the new pixel depth value is less than or equal to the current pixel depth value, the second comparator outputs a signal to the first and second buffer array which notifies the first buffer array to store the new window identification and the second buffer array to store the new depth value.

In another embodiment of the present invention applicable to two-dimensional images within each of a plurality of overlapping windows, the depth value associated with the subject matter within a window on a screen comprises only a window identification wherein the depth buffer stores only the current window identification. In response to an input request, the window manager outputs a new window identification to the depth buffer wherein the comparator in the depth buffer compares the window identification of the newly transmitted subject matter to the window identification of the currently displayed subject matter. If the new window identification identifies the same window or a window closer to the viewer, the comparator outputs signals to the refresh buffer and depth buffer to direct the refresh buffer to store the new subject matter for refreshing the screen display with the new subject matter and to direct the depth buffer to store new window identifications.

BRIEF DESCRIPTION OF THE DRAWINGS

FIG. 7A illustrates the relative position of a stack of at least partially overlapping windows on a screen display, together with a stylized grid of pixel values representative of the depth of the subject matter being displayed on the screen;

FIG. 7B illustrates a screen display of the reordering of the windows in 7A, together with a stylized grid of pixel values representative of the changes in the depth of the subject matter being displayed on the screen which are generated by the window manager in the first embodiment of the present invention.

FIG. 11A illustrates a plurality of at least partially overlapping windows on the display screen of a display monitor, together with stylized grid of pixels representative of the window identification of the subject matter being displayed on the screen.

FIG. 11B illustrates a screen display wherein the windows of FIG. 11A are reordered, together with a stylized grid of pixels representative of the changes in the window identification of the subject matter being displayed on the screen which is changed by the window manager in the third embodiment of the present invention.

BEST MODE FOR CARRYING OUT THE INVENTION

Figure 1:
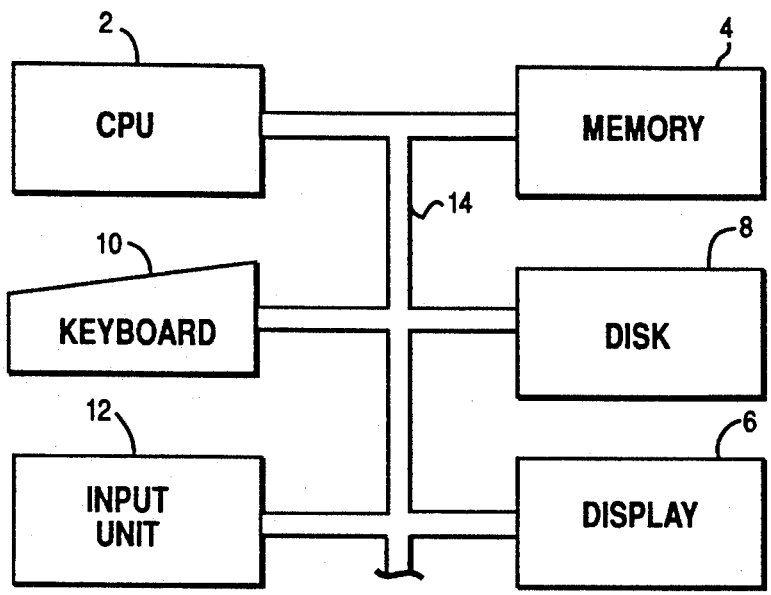
FIG. 1 is a generalized diagrammic representation of the conventional computer system which may be adapted to the practice of the present invention.

For a more detailed understanding of the present invention, reference is made to FIG. 1, which illustrate the major components of the prior art computer system which may be adapted to accomplish the method of the present invention. The CPU 2 of the conventional computer system is supported by system memory 4 in which all of the applications programming is stored. In recent prior art computer systems, the CPU 2 can run two or more applications concurrently. The CPU 2, in combination with memory 4, controls a display unit 6. The computer system typically has supplemental disk storage 8. Input to the system may be accomplished through a keyboard 10, which may be used to input a specific command or which may be used to move the cursor on the display screen of the display unit 6 to a menu-based command. Alternatively, an input command may be received from another input unit 12, a mouse for example. The elements in this computer system are interconnected over a system bus 14.

A computer system which may be adapted to form the apparatus and method of the present invention includes an IBM RT having a CPU based on reduced instruction set architecture (RISC) supported by 2 MB or more of memory and Version 2.2 or later of the AIX[2] operating system. For some embodiments, an IBM PS/2[3] having a conventional Intel 80286 or 80386 microprocessor supported by an OS/2[3] operating system and 1 MB or more units of memory may be used.

Figure 2:
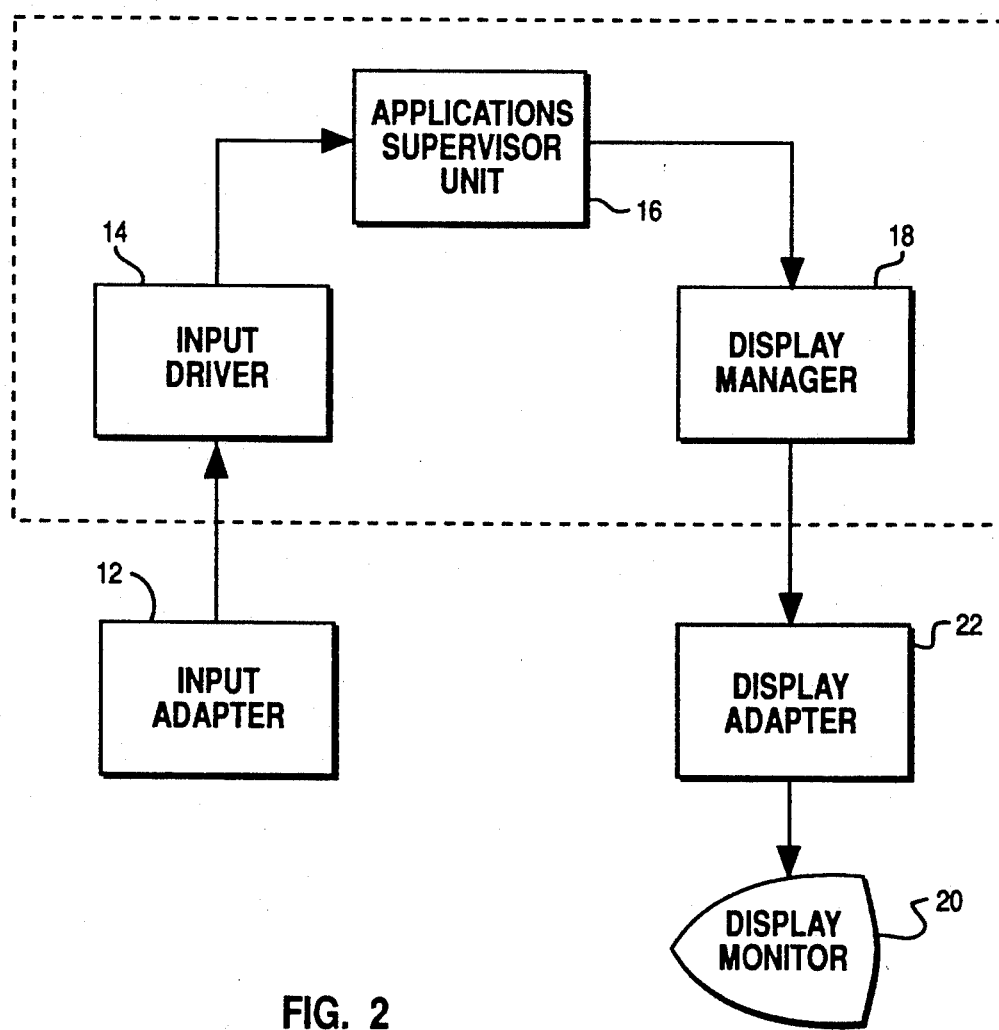
FIG. 2 is a diagrammatic representation of the interactive display portion of the computer system which may be adapted to practice the present invention.
Figure 3:
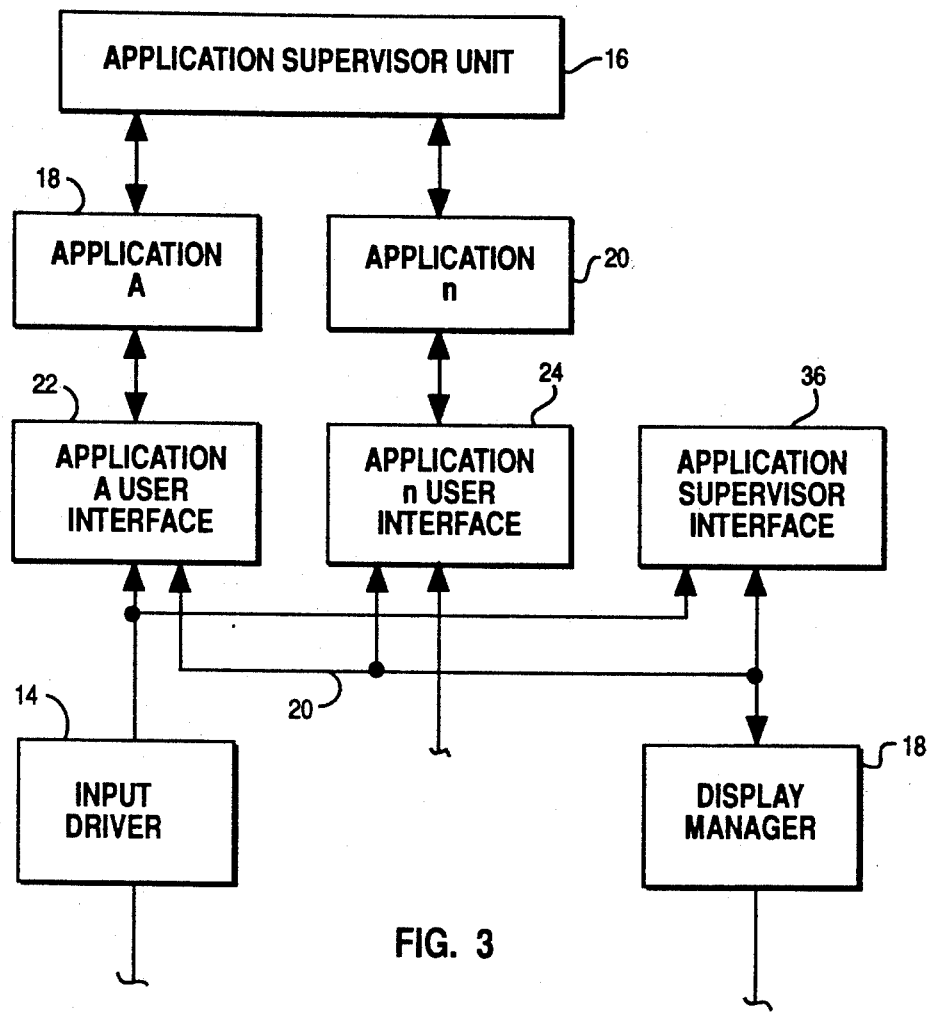
FIG. 3 illustrates the combination of logic units associated with forming a plurality of at least partially overlapping windows on an interactive display monitor for use with the present invention.

The system logic and apparatus in such computer systems are shown in more detail in FIGS. 2 and 3. In FIG. 2, an input may be provided through a conventional input adapter 12, which is connected to the computer system though an input driver 14, which has the conventional apparatus and logic required to interface the input operations to the particular data processing system implementing the present invention. The driver 14 serves the function of converting the signals received from the input adapter to data which is operable within the present invention.

Routines and logical operations required for the present invention are usually supervised by an applications supervisor unit 16, which will be subsequently described. Changes to the display 6 are controlled by a display manager 18, which communicates with a display monitor 20 through a display adapter 22. The display adapter 22 adapts or converts the commands from the display manager to signals which are more readily usable by the display monitor 20.

[2]AIX is a registered trademark of IBM Corporation.
[3]PS/2 and OS/2 are trademarks of IBM Corporation.

The software for implementing the present invention is stored in memory 4 and carried out under the direction of the application supervisor unit 16, which is typically also stored in memory 4 under the control of CPU 2. This software will now be described in more detail with respect to FIG. 3.

In recent computer systems, numerous applications designated application "A", 18, through application "n", 20, can be operated concurrently. Output of each of these different applications may be viewed on different windows "A, B, C, D, . . . n" formed on the interactive screen display monitor 20, and designated 28, 30, 32 and 34, respectively, in FIG. 4. The user of the computer system interfaces with each application through the input adapter 12 and the corresponding input driver 14 to application user interfaces 22 and 24 for applications A and "n", respectively. The interfaces typically also contain a conventional echo manager which directly conveys the input commands directly with the resulting display changes for a particular window to the display manager 18 over bus 20. The application supervisor unit 16 coordinates and multiplexes these various individual window operations and also exercises control over the display manager 18 through the application interface 26. The display manager 18 typically includes a window manager for controlling the relative position of the overlapping windows as a result of inputs received via bus 20 from input driver 14.

Figure 4A:
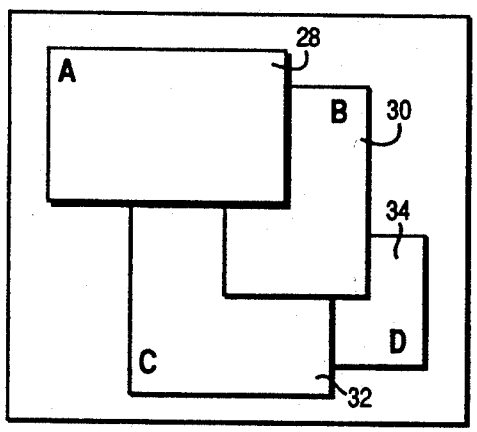
FIG. 4A illustrates the initial position of a plurality of at least partially overlapping windows on a screen display.
Figure 4B:
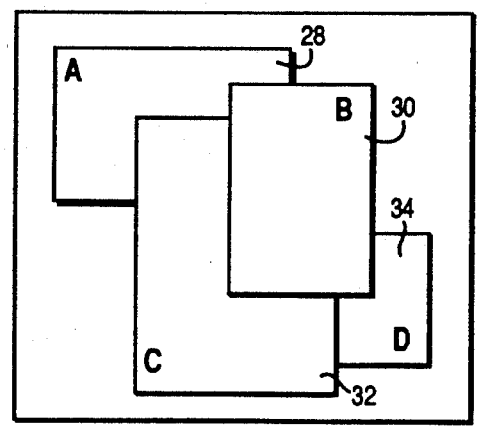
FIG. 4B illustrates the reordering of the plurality of at least partially overlapping windows of FIG. 4A when the top window is moved to the bottom.
Figure 5:
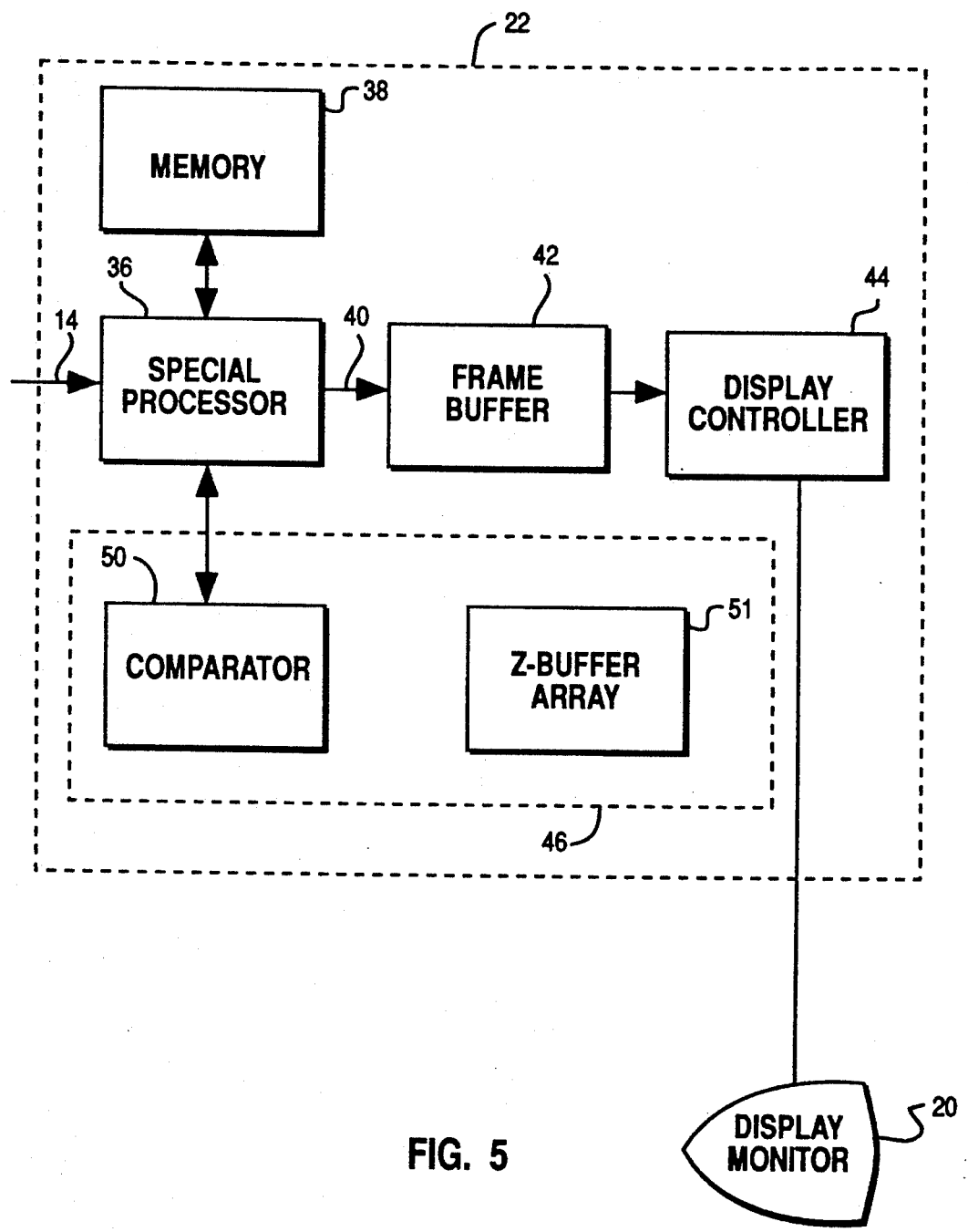
FIG. 5 is a diagrammatic representation of the display adapter which may be utilized in the practice of the present invention.

In such computer systems having an interactive display 6 composed of a display monitor 20 and display adapter 22, the plurality of overlapping windows A, B, C, and D, formed on the screen of the monitor, such as shown in FIG. 4, wherein each window displays subject matter originating from different applications, e.g. A, B, C, and D, run simultaneously on CPU 2. In effect, each application "owns" a window on the screen. Normally the applications are independent of one another so the contents of one window have nothing to do with the contents of another window owned by a different application. The windows may be of different sizes and may overlap, as shown in FIG. 4.

In order to change the relative position of the windows, the user inputs a request through input unit 12. For example, if the user wishes to push the top window A to the bottom, window B becomes the new top window. All of window B is now visible and part of window C which was obscured by window A is now visible as well. When all or part of the window becomes visible or "is exposed", the application which owns the window is notified by the window manager that it must regenerate part or all of the contents being displaced on its window. It is each application's responsibility to rewrite the part of the window that was newly exposed. Optionally, each application can simply rewrite its entire window.

In the present example (FIG. 4), the application for window B 30 must at least rewrite the upper-left portion of its window B and the application for window C must do the same with a small part of the upper-left part of its window C. Because each window does not occupy the entire display screen, it may be partly or totally obscured by the other windows.

Each application is not allowed to write directly to the display adapter 22 in order to generate a display associated with each application. Rather, each of the applications A, B, C, and D must request the window manager to transmit data to the display adapter 22 for refreshing its portion of the display screen on that particular application's behalf. The software-based window manager thus insures that the output for a given application is written only to the window(s) owned by the application by "clipping" the output for that particular application which is partly or totally obscured by other windows. This clipping has, in the past, been done by software and is quite timeconsuming.

The outputted subject matter from each application A, B, C, and D, are transmitted over the bus 14 to a special processor 36 in the display adapter which controls the operations of the display adapter 22. The special processor 36 has associated dedicated memory 38 for storing data on which it operates. The processor converts the subject matter transmitted from the CPU 2 into a two-dimensional array of pixel values having specific pixel addresses which relate to specific points on the display screen, wherein those portions of the transmitted subject matter of each application which is obscured by a partial or overlapping window of another application has already been clipped. The special processor then conveys this clipped data, in its converted form, over a bus 40 to a frame or refresh buffer 42. The frame buffer or refresh buffer 42, typically a RAM array, stores the pixel values in digital form in the relative location at which they will appear on the actual screen of the display monitor 20. These pixel values are then converted by display controller 44 to signals which are used to project a representation of the subject matter onto the display monitor 20. Typically, the display must be refreshed by the retransmission of the pixel values located in the frame buffer 42 every 1/30 or 1/60 of a second.

In the computer system of the present invention a novel Z-buffer subsystem 46 is added to the display adapter 22 to substantially reduce the amount of software clipping that the window manager must perform while giving a computer application direct access to the display adapter 22. In effect, the software-based window manager treats each of the windows as a polygon in three-dimensional space. For the specific windowing purposes desired by the present invention, each polygon is parallel to the plane of the background and orthogonal to the line of sight of the user; thus, a single depth value serves for each polygon. Accordingly, no two polygons or "windows" have the same depth, so there is never an ambiguity about which polygon is "in front" when computing the value of a pixel. It should be noted, however, that this invention can be adapted to windowing systems wherein the subject matter being displayed in each window constitutes a subject matter situated in three-dimensional space.

Five alternative embodiments of a Z-buffer system 46 to assist a window manager are set out in more detail below. In each embodiment, the window manager of the display manager 18 decides on the new ordering (top to bottom) of the windows A, B, C, and D, make some adjustments to the window depth entries to be stored in the Z-buffer system in the display adapter 22 and then notifies each affected application being run on the CPU 2 that all or part of its window must be redrawn. Each application running on the CPU 2 then transmits the subject matter through the display adapter 22 so that the windows associated with the application can be redrawn. The Z-buffer system 46 provides the clipping that the window manager provided in prior art computer systems.

Figure 6:
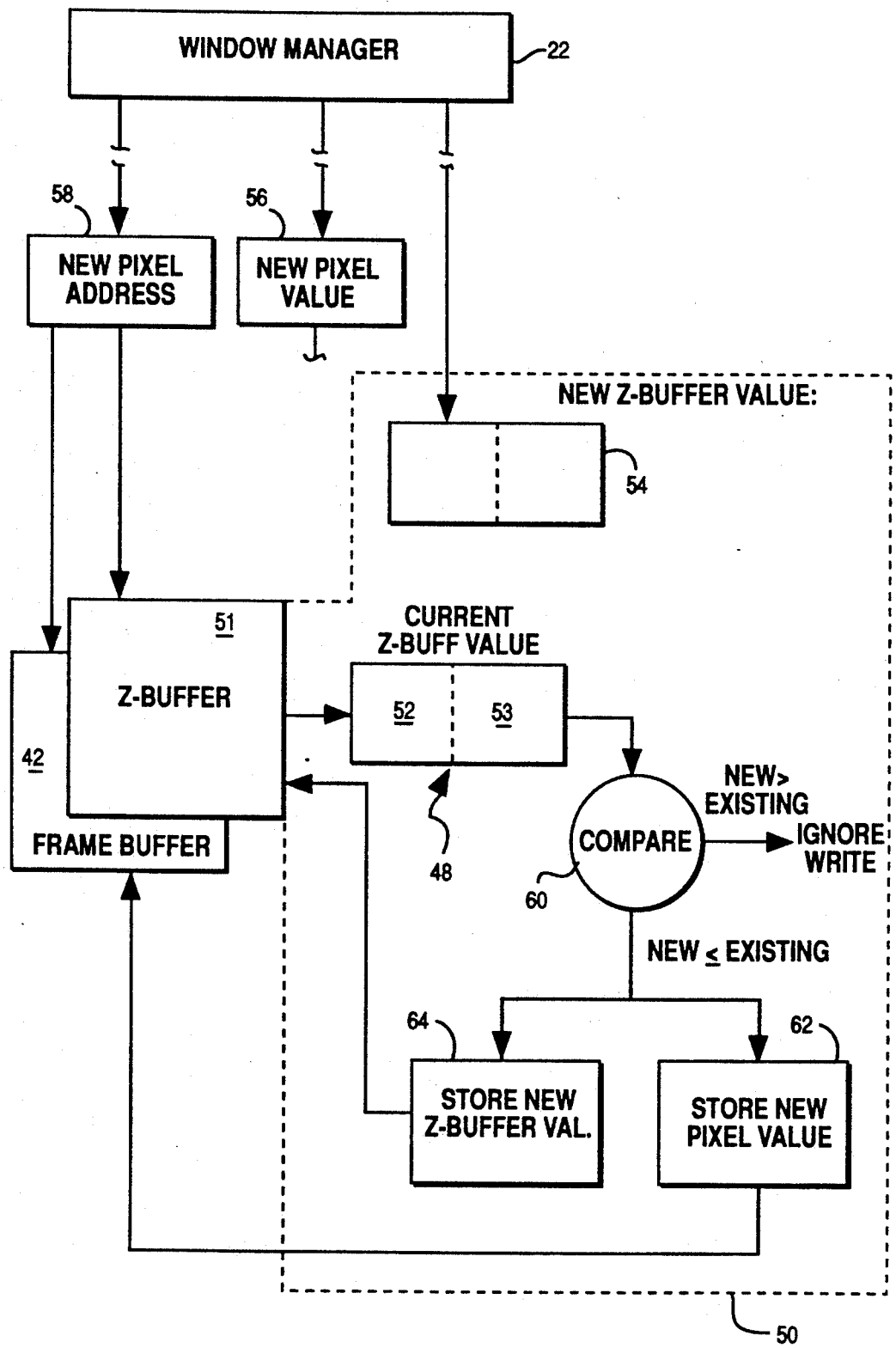
FIG. 6 is a diagrammic representation of the Z-buffer system which may be utilized in one embodiment of the present invention.

In each embodiment, the Z-buffer system 46 implements a "Z-buffer algorithm". The algorithm implemented in the Z-buffer system 46 may be as follows:

(A) Initialize all the pixel values/intensity values $C(X, Y)$ to "background".
(B) Initialize all the Z-buffer values $Z(x, y)$ to the largest representable (farthest away) Z-value.
(C) For each polygon (window) on the display screen:
   For each pixel $p(x, y)$ in the polygon:
   Compute $C_P$, the pixel's color/intensity value;
   Compute $Z_p$, the pixel's z-value; and
   If $Z_P$, is less than or equal to $Z(x, y)$, then:
      Store new color/intensity value: $C(x, y) \leftarrow CP$ Store new z-value: $Z(x, y) \leftarrow Z_p$ In the first embodiment (FIG. 6), the Z-buffer system 46 comprises a comparator 50 and a Z-buffer array 51, which contains the current Z-buffer depth values for the subject matter on the screen. Each Z-buffer value is specifically associated with a pixel color/intensity value having a specific pixel address based upon its relative position in the two-dimensional array formed by the frame buffer 42. The existing stored depth value contains both the depth of the window formed on the screen relative to the "background" reference position, which is typically the position farthest away from the viewer, and the depth of the particular pixel within the window in which the pixel is located.

For the purpose of storage within the Z-buffer array 51, the depth value is formed by concatenating the window depth with the pixel depth within the window. For example, in a register 48 for storing an existing pixel value from the Z-buffer array 51 for use in the comparator 50, the window depth occupies the higher bit positions 52 and the pixel depth within the window is stored in the lower bit positions 53 so that all pixels in a given window are considered to be in front of all pixels associated with a window lower in the stack. It should be noted, however, that for most applications, the individual pixel depth within the window is a constant.

In response to a request through the input device 12 to rearrange the windows on the display screen, the window manager determines the new relative depth positions of the plurality of windows A, B, C, and D, assigns a buffer depth value to each pixel in the frame buffer 42, and notifies each application whose display is affected to retransmit either all of the subject matter associated with its display or at least the portion thereof which has been affected by the proposed screen rearrangement.

The window manager then transmits the regenerated subject matter to the display adapter 22 for conversion into pixel values which can be stored in buffer register 56, together with its corresponding pixel address to register 58 and its corresponding Z-buffer depth value to register 54. For each pixel address, a conventional comparator 60 compares the new Z-buffer depth value from window register 54 to the existing Z-buffer depth value transferred into register 48 from its location in the Z-buffer array 51.

If the new Z-buffer depth value is larger than the existing Z-buffer depth value the comparator 60 directs the frame buffer 42 to ignore the "write" command from the window manager. In the event the new Z-buffer depth value is less than or equal to the existing Z-buffer depth value, the comparator 60 outputs a signal to the frame buffer 42 which notifies it to store the new pixel value at the given pixel address and also outputs a signal to the Z-buffer array to notify it to store the new Z-buffer depth value. This process is continued until each existing Z-buffer depth value associated with each affected pixel address in the frame buffer 42 is compared to a new Z-buffer depth value for that address.

Thus, the Z-buffer system 46 of the first embodiment achieves the goal of allowing the Z-buffer system 46 to do the "clipping" for the window manager. As long as the "write" request from the window manager contains the Z-buffer depth value appropriate for the window associated with a particular application, the Z-buffer system 46 insures that only those pixels which are actually visible for the window are updated. In this embodiment, however, it is somewhat time-consuming for the window manager to change the relative stacking order of the windows. FIG. 7A shows the relative position of stacked windows A, B, C, and D on the screen of the display monitor 20 of the present invention, together with a stylized 9×8 grid of pixels representative of the subject matter being displayed on the screen wherein the numbers associated with each pixel position correspond to the depth of the associated window in which that particular pixel is located, e.g., 0, 1, 2, 3, and 4, for example. FIG. 7B shows a screen display of the same windows, except that window B has been pushed to the bottom requiring that the depth values associated with all the pixels and all the windows must be updated before the windows can be withdrawn for the new window arrangement. A corresponding stylized 9×8 grid of pixels representative of the new windows positions is shown below the screen in FIG. 7B. The pixels that must be updated when moving the window A to the bottom of the stack of windows are shown in boldface in the stylized grid of FIG. 7B.

Figure 8:
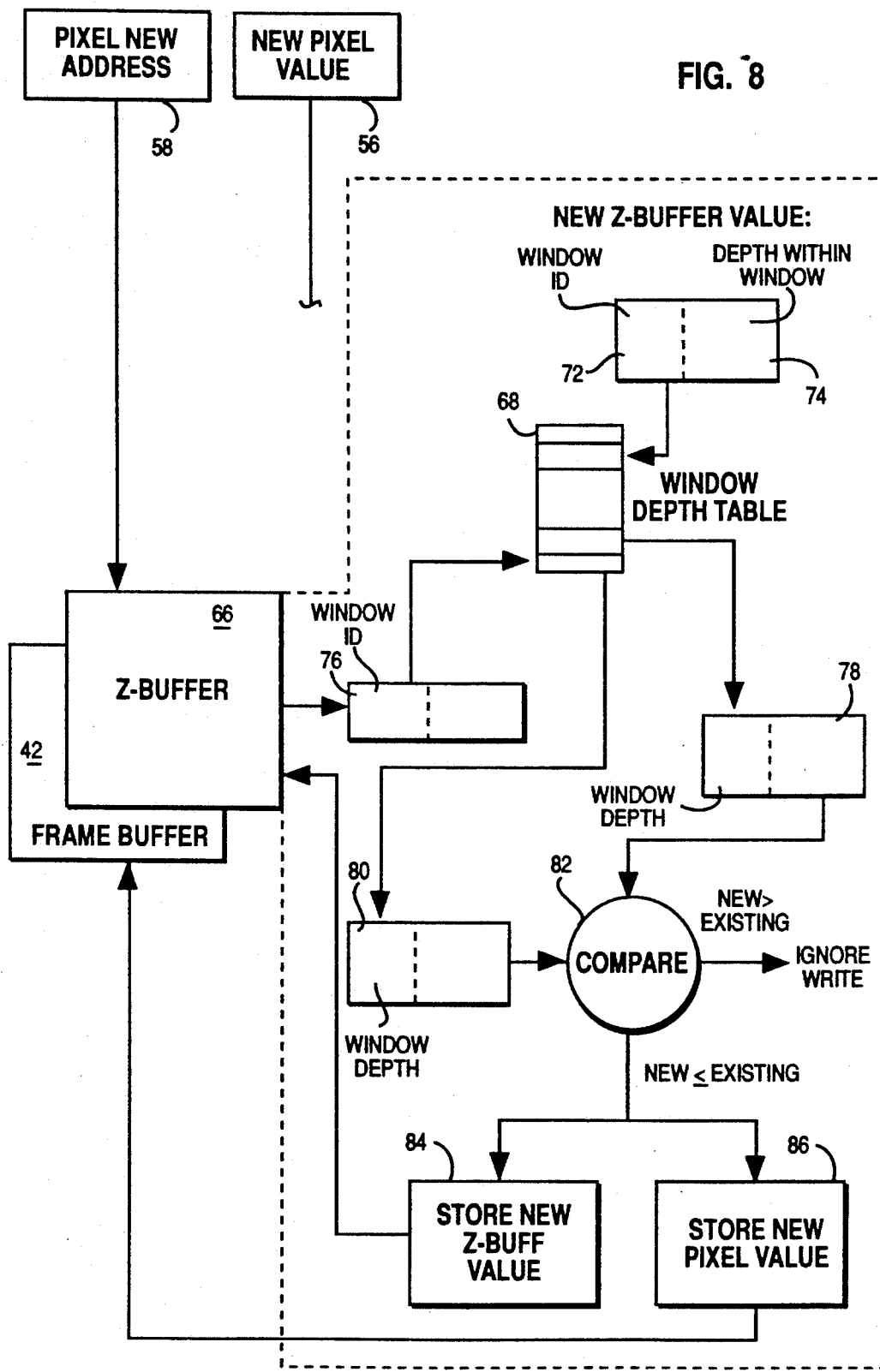
FIG. 8 is a diagrammatic representation of a second embodiment of the Z-buffer system which may be used to practice the present invention.

In the second embodiment (FIG. 8), the Z-buffer array 66 also contains the current Z-buffer depth value for the subject matter on the screen; however, the existing stored depth value is specified in a different matter from that in the first embodiment. In the second embodiment, the existing stored depth value contains both a window identification integer which identifies the particular window A, B, C, or D and a pixel depth value within the window formed on the screen. The window depth is then obtained by using the window identification integer as an index to a window depth table 68 containing the depth of each window relative to the referenced position. Preferably, the window depth table is a conventional RAM array.

Considering the second embodiment in more detail, the window manager, in response to a request from the input device 12 to rearrange the windows on the screen display, determines the new relative depth positions of the plurality of windows A, B, C, and D, assigns a new window depth value to each window and transmits the new window depth value to the window depth table 68. The window manager also notifies each application whose display is affected to retransmit either all of the subject matter associated with its display or at least the portion thereof which has been affected by the proposed screen rearrangement.

The transmitted subject matter is routed to the display adapter 22 for conversion into an array of pixel values by the processor 36 wherein each pixel can be sequentially stored in register 56, together with its corresponding pixel address in register 58, in the same manner as in the first embodiment. The window manager, however, transmits a different depth value to register 70 from that transferred to register 54 in the first embodiment, in that a window identification integer, rather than a true depth value, is stored in the higher bit positions 72 of register 70 and the pixel depth associated with the particular window is stored in lower bit positions 74.

In a corresponding manner, register 76 receives an existing depth value from Z-buffer array 66 for the particular pixel location wherein the value comprises a window identification integer in the higher bit positions of register 76 and a pixel depth within the window in the lower bit positions of register 76.

In the second embodiment, the Z-buffer depth values contained in registers 74 and 76 are then modified by substituting the appropriate depth value for each window identification from window depth table 68 prior to the Z-buffer value being stored in registers 78 and 80, respectively. A conventional comparator 82 then compares the new Z-buffer depth value in register 78 with the existing Z-buffer depth value in register 80. If the new value in register 78 is greater than the existing value of register 80, the comparator 82 instructs the frame buffer 42 to ignore the write command from the window manager and the particular pixel value for the particular pixel address is not updated. In the event the new value in register 78 is less than or equal to the existing value in register 80, the comparator 82 notifies the frame buffer 42 to accept the new pixel value at the particular pixel address and also notifies the Z-buffer 66 to update the particular Z-buffer value for the particular pixel address.

It should be noted that it is not necessary to change all the depth values for all pixel locations in the Z-buffer 66. For example, for an 8 bit window identification, at most only 256 window depth table entries must be changed. Whereas, if the windows cover most of the screen display surface on a 1024×1024 pixel display, about 1 million Z-buffer entries would have to be changed under the first embodiment. In order to obtain this benefit, however, the additional window buffer table 68 is required.

In order for table 68 not to cause a delay in updating the frame buffer and Z-buffer, the table 68 must read the window identification integers in registers 70 and 76 and transmit corresponding true depth values to registers 78 and 80 very rapidly. In fact, the processing must be at the same rate at which pixels are drawn. If the table 68 is implemented as another stage in the graphics pipeline, it will add slightly to the latency needed for the first pixel of an operation to appear, but it will not slow down the rate of drawing pixels.

Figure 9A:
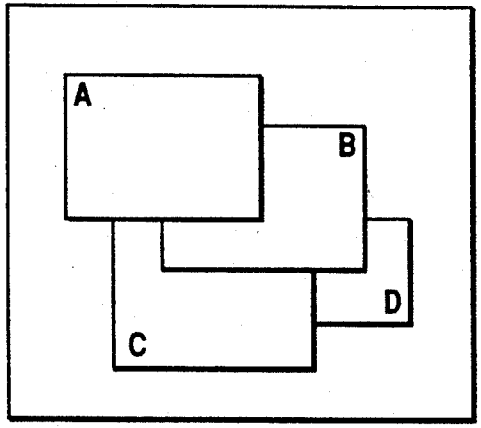
FIG. 9A illustrates the relative position of a plurality of at least partially overlapping windows on the screen of the display monitor, together with a grid of pixels representative of the window identification of the subject matter being displayed.
Figure 9B:
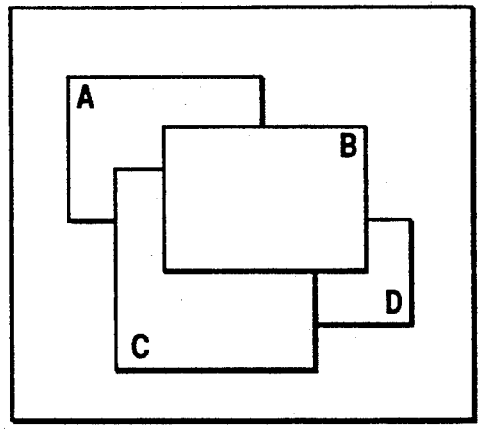
FIG. 9B illustrates a show screen display of the reordered windows of FIG. 9A, together with a stylized grid of pixels representative of the window identification of the subject matter being displayed on the screen which are changed by the window manager in the second embodiment of the present invention.
Figure 10:
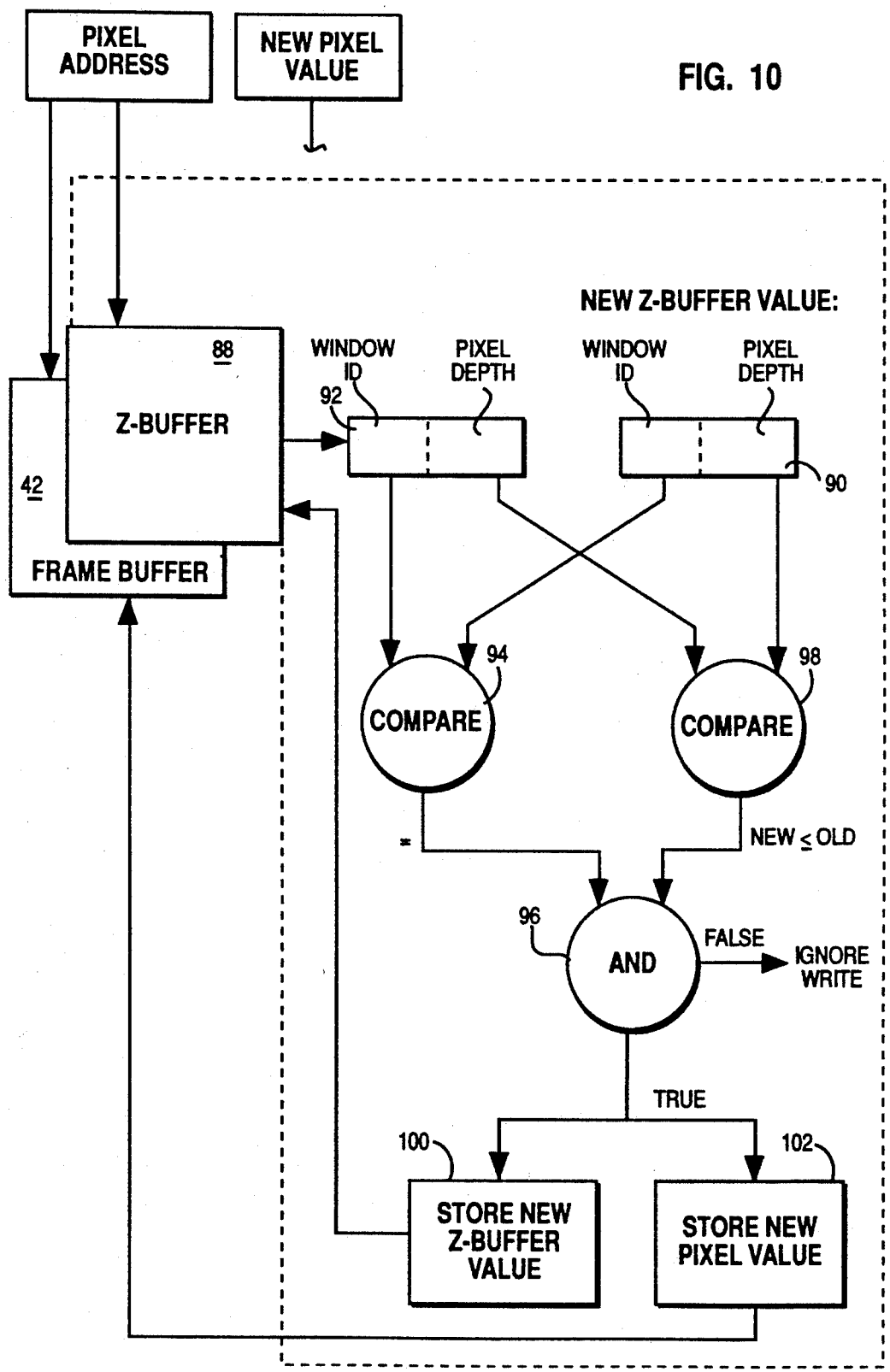
FIG. 10 is a diagrammatic representation of a third embodiment of the Z-buffer system which may be used to practice the present invention.

FIGS. 9A and 9B show how the window identification portion of the depth value for the pixels change as window A is pushed from the top to the bottom. It should be noted that although some values have changed, they are not shown in boldface because they are not changed by the window manager, as was the case in the first embodiment. In this example, the window manager changed only the few entries in the window depth table (4 in this particular case). Window identification integers in the Z-buffer are then changed automatically as applications B and C redraw the windows by virtue of the new depth values in the window depth table 68.

In the third embodiment, the Z-buffer array 88 also contains a depth value consisting of a window identification integer and a pixel depth within the window for each pixel. Instead of a window depth table, however, the third embodiment uses a direct comparison of the new window identification integer sent to register 90 with the existing window depth value transferred from the Z-buffer array 88 to register 92. The window identification integers for registers 90 and 92 are stored in the higher order bit locations and the pixel depth values are stored in the lower bit positions in a like manner to that in the other embodiments. Considering the third embodiment in more detail, the existing window identification integer from register 92 and the window identification integer from register 90 are read by a conventional comparator 94. If the comparator 94 determines that the window identifications are equal, it outputs an enable signal to an AND gate 96. In addition, the existing pixel depth value in register 92 is compared to the new pixel depth value from register 90 in a conventional comparator 98. If the new pixel depth value is less than or equal to the old pixel depth value, the comparator 98 outputs an enable signal to the AND gate 96. If the AND gate 96 does not receive an enable signal from both comparator 94 and comparator 96, the AND gate instructs the frame buffer 42 and Z-buffer 88 to ignore the write command from the window manager. If the AND gate 96 receives enable signals from both the comparator 94 and the comparator 98, it instructs the Z-buffer to store the new Z-buffer value 100 and instructs the frame buffer 42 to store the new pixel value 102 for the particular pixel location.

The Z-buffer of the third embodiment provides an advantage over the Z-buffer in the second embodiment in that a separate high speed window depth table is not needed. It should be noted that the comparisons by comparator 94 and comparator 98 may proceed in parallel. The disadvantage of this scheme is that the window manager must explicitly change the ownership of pixels by storing new window identification integers in the Z-buffer 88 when the windows are rearranged.

FIGS. 11A and 11B show how the Z-buffer values change as window A is pushed from the top to the bottom of the stack. The Z-buffer values modified by the window manager are shown in boldface. It should be noted, however, that significantly fewer Z-values must be modified with the Z-buffer system of the third embodiment than with respect to the first embodiment, where all the pixels and all the windows required updating regardless of whether a window was in fact affected. In this embodiment, only the pixels in the overlapping areas of affected windows are updated.

In the fourth embodiment, the window manager transfers information to the display adapter in the same manner as in the third embodiment, but the way in which it is organized in the display adapter 22 is different. Considering the fourth embodiment in more detail, the display adapter 22 includes both a Z-buffer array 104 for storing the depth information of a pixel value within a window and a separate W-buffer array 106 for storing the window identification integer associated with each pixel location. In this embodiment, the window manager outputs the new window identification to register 108 in the display adapter. The associated pixel depth value within the window is loaded by the window manager into register 110. For any pixel location in the sequence, the existing window identification integer from the W-buffer 106 is stored in register 112 and a corresponding pixel depth value from Z-buffer 104 is stored in register 114. A conventional comparator 116 then compares the new window identification integer from register 108 with the existing window identification integer from register 112. If the window identifications are not equal, the comparator 116 outputs a signal to the Z-buffer and frame buffer to instruct them to ignore the write command from the window manager. If the window identification integers from register 108 and register 114 are equal, however, the comparator 116 generates an enable signal which is transmitted to a conventional comparator 118. Comparator 118 also compares the existing pixel depth value stored in register 114 with the new pixel depth value stored in register 110. If the new pixel depth value is greater than the existing pixel depth value, the comparator 118 outputs a command to the Z-buffer and frame buffer to ignore the write command from the window manager. In the event the new pixel depth value is less than or equal to the old pixel depth value and the comparator 118 has received an enable signal from comparator 116, comparator 118 outputs an enable signal to instruct the Z-buffer 104 to store the new pixel depth value and instructs the frame buffer 42 to store the new pixel value.

Figure 12:
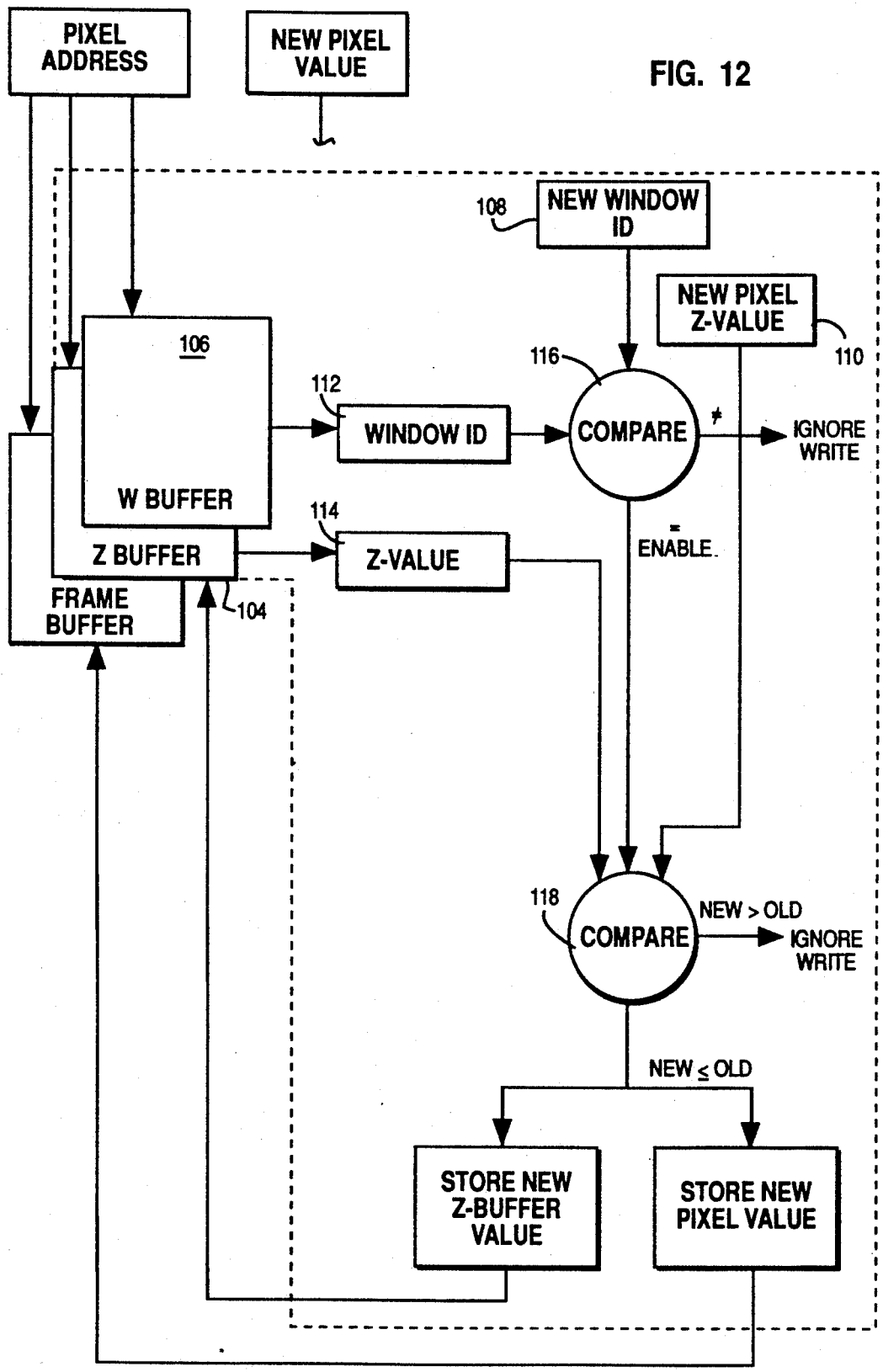
FIG. 12 is a diagrammic representation of a fourth embodiment of the Z-buffer system which may be used to practice the present invention.

The fourth embodiment provides an advantage over the third embodiment in that the window identifications need be transferred to the display adapter 22 only once for each group of graphics operations. In addition, the window manager's write access to the new window identification register 108 on the display adapter 22 can be restricted to supervisor-state programs so that the register cannot be corrupted by application code. Once the ownership of the appropriate pixels has been set by the window manager and the proper window identification has been loaded to the register 108, it is possible to give the application program direct access to the display adapter 22 with the knowledge that it cannot corrupt areas of the screen outside the window(s) that it owns, which can result in a significant savings in overhead. Although FIG. 12 shows the two comparisons proceeding sequentially, it should be noted that the two comparisons can be done in parallel. It should also be noted that the Z-values modified by the window manager are limited to the pixels as are shown for the third embodiment in FIG. 11B.

In a fifth embodiment which may be suitable for the presentation of two-dimensional subject matter within each of the plurality of overlapping windows, the depth value associated with the subject matter within a window on a screen comprises only a window identification. The depth buffer array, therefore, stores only the existing window identification rather than a composite depth value comprising a window depth and a pixel depth within the window. In this embodiment, the window manager and the Z-buffer system disclosed for the first embodiment may be used with the following minor modifications. The Z-buffer array 51 and register 48 only store a window identification integer as the Z-buffer depth value and the window manager 22 outputs only a new window identification integer to register 54. In all other respects, the operations of the comparator 50 disclosed for the first embodiment operates in substantially the same manner as previously described. Although the fifth embodiment may not be suitable for displaying complex subject matter within a window, it may be a simple solution for many types of window applications.

While the invention has been particularly shown and described with reference to the preferred embodiments, it will be understood by those skilled in the art that various other changes in form and detail may be made without departing from the spirit and scope of the invention.

We claim:

1. In a computer system having a refresh buffer and an interactive display terminal with a screen display on which is formed a plurality of at least partially overlapping windows, each window currently displaying subject matter generated by one of a plurality of applications running on the computer system, the improvement comprising:

means for requesting a rearrangement of the depth of the plurality of windows relative to a reference position from a current arrangement to a new arrangement;

manager means for determining the depth of the subject matter associated with each of the windows, wherein said manager means, in response to the input request, determines the new depth of the subject matter in each of the plurality of windows affected by the requested rearrangement, transmits new depth values for the affected subject matter, and instructs each application with a window with affected subject matter to retransmit at least the portion of the subject matter associated with each window which will become visible as a result of the rearrangement; and buffer means for storing the depth values of the subject matter associated with each of the windows currently being displayed on the screen, wherein said buffer means includes means for comparing the depth value for the retransmitted subject matter to the depth value for the currently displayed subject matter in response to the input request and, if the retransmitted subject matter has a depth value associated with the same window or a window closer to the viewer, the comparator means instructs the refresh buffer to store the retransmitted subject matter whereby only the subject matter to be displayed is passed to the refresh buffer from which the screen display is refreshed.

2. In a computer system having a refresh buffer and an interactive display terminal with a screen display on which is formed a plurality of at least partially overlapping windows, each window currently displaying subject matter generated by one of a plurality of applications running on the computer system, the improvement comprising:

means for determining the depth of the subject matter shown in each of said windows relative to a reference position;

depth buffer means for storing the depth values of the subject matter in said windows currently visible on said display;

means for requesting a change in the depth of at least one of said overlapping windows from the current window arrangement to a new arrangement;

means responsive to said change requesting means for providing an output to be stored in said refresh buffer comprising at least a portion of the subject matter in said windows upon said new arrangement including subject matter which will become not visible on said display as a result of said change;

means responsive to said output for comparing the depth values of the subject matter in said output to the depth values, stored in said depth buffer, of said currently visible subject matter; and, means responsive to said comparing means for permitting the storage in said refresh buffer of only those portions of the subject matter in said output which said comparing means determines to have a depth value associated with a window either as close as or closer to the viewer than the depth values of said currently visible subject matter.

3. The computer system of claim 2 further including means responsive to said comparing means for storing in said depth buffer the depth values of those portions of said output subject matter permitted to be stored in said refresh buffer.

4. The computer system of claim 3 further including means responsive to said comparing means for inhibiting the storage in said refresh buffer of said output subject matter determined to have a depth value associated with a window further from the viewer than the depth values of said currently visible subject matter.

5. The computer system of claim 2 wherein
said visible subject matter in said display is formed by a matrix of pixels;
said refresh buffer stores a matrix of pixel values, each stored pixel value coinciding with a visible pixel position, and
said depth buffer stores the depth values of each visible pixel.

6. The computer system of claim 5 further including means for storing in said depth buffer, the depth values of the pixels in those portions of said output subject matter stored in said refresh buffer.

7. The computer system of claim 6 further including means responsive to said comparing means for inhibiting the storage in said refresh buffer of the pixel values of pixel positions in said output subject matter determined to have depth values associated with a window further from the viewer than the depth values of said currently visible pixels.

8. In a computer system having a refresh buffer and an interactive display terminal with a screen display on which is formed a plurality of at least partially overlapping windows, each window currently displaying subject matter generated by one of a plurality of applications running on the computer system, the method comprising:

determining the depth of the subject matter shown in each of said windows relative to a reference position;
storing the depth values of the subject matter in said windows currently visible on said display;
requesting a change in the depth of at least one of said overlapping windows from the current window arrangement to a new arrangement;
in response to said change request, providing an output to be stored in said refresh buffer comprising at least a portion of the subject matter in said windows upon said new arrangement including subject matter which will become not visible on said display as a result of said change;
comparing the depth values of the subject matter in said output to the stored depth values of the subject matter in said current arrangement; and,
storing in said refresh buffer, only those portions of the subject matter in said output which said comparison determines to have a depth value associated with a window either as close as or closer to the viewer than the depth values of said currently visible subject matter.

9. The matter of claim 8 further including the step of storing the depth values of those portions of the output subject matter stored in said refresh buffer.

10. The method of claim 9 further including the step of inhibiting the storage in said refresh buffer of said output subject matter determined to have a depth value associated with a window further from the viewer than the depth values of said currently visible subject matter.

* * * * *

UNITED STATES PATENT AND TRADEMARK OFFICE
CERTIFICATE OF CORRECTION

PATENT NO. : 5,241,656
DATED : Aug. 31, 1993
INVENTOR(S) : Larry K. Loucks and Richard O. Simpson It is certified that error appears in the above-identified patent and that said Letters Patent is hereby corrected as shown below:

Col. 9, line 1, please delete "Z(x, y" and insert --Z(x, y)--;

Col. 14, line 10, after "application", please insert --associated--; and

Col. 16, line 24, please delete "matter" and insert --method--.

Signed and Sealed this

Sixteenth Day of August, 1994

Attest:

BRUCE LEHMAN

Attesting Officer       Commissioner of Patents and Trademarks